United States Patent
Aldalbahi et al.

(10) Patent No.: US 11,718,537 B2
(45) Date of Patent: Aug. 8, 2023

(54) SYNTHESIS OF COPPER OXIDE NANOPARTICLES

(71) Applicant: KING SAUD UNIVERSITY, Riyadh (SA)

(72) Inventors: Ali Aldalbahi, Riyadh (SA); Raneem Aldawish, Riyadh (SA); Manal Ahmed Gasmelseed Awad, Riyadh (SA); Noura Saleem Aldosari, Riyadh (SA); Reem Hamad Alshathri, Riyadh (SA); Leen Abdullah Aldwihi, Riyadh (SA); Raghad Alammari, Riyadh (SA); Khloud Ibrahim Bin Shoqiran, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 155 days.

(21) Appl. No.: 17/210,178

(22) Filed: Mar. 23, 2021

(65) Prior Publication Data
US 2021/0403643 A1    Dec. 30, 2021

Related U.S. Application Data (62) Division of application No. 16/913,336, filed on Jun. 26, 2020, now Pat. No. 10,995,010.

(51) Int. Cl.
*C01G 3/02*     (2006.01)
*A01N 59/20*    (2006.01)
*B01J 35/00*    (2006.01)
*B01J 35/02*    (2006.01)
*B01J 23/72*    (2006.01)
(Continued)

(52) U.S. Cl.
CPC .............. *C01G 3/02* (2013.01); *A01N 59/20* (2013.01); *B01J 23/72* (2013.01); *B01J 35/004* (2013.01); *B01J 35/023* (2013.01); *C08G 69/48* (2013.01); *B82Y 30/00* (2013.01); *B82Y 40/00* (2013.01); *C01P 2004/64* (2013.01)

(58) Field of Classification Search
CPC .. C01G 3/02; A01N 59/20; B01J 23/72; B01J 35/004; B01J 35/023; C08G 69/48
See application file for complete search history.

(56) References Cited

U.S. PATENT DOCUMENTS

2009/0260260 A1    10/2009    Whitaker et al.

FOREIGN PATENT DOCUMENTS

MX       349067 B       6/2017
WO    2015016404 A1    2/2015

OTHER PUBLICATIONS

Vaidehi, D., Bhuvaneshwari, V., Bharathi, D., & Sheetal, B. P. (2018). Antibacterial and photocatalytic activity of copper oxide nanoparticles synthesized using Solanum lycopersicum leaf extract. Materials Research Express, 5(8), 085403.
(Continued)

*Primary Examiner* — James A Fiorito
(74) *Attorney, Agent, or Firm* — Nath, Goldberg & Meyer; Richard C. Litman (57) ABSTRACT

A method of synthesizing copper oxide nanoparticles includes preparing a liquid extract of *Rumex vesicarius*, dissolving copper salt in the liquid extract to provide a solution with copper nanoparticles, adding a base to the solution with copper nanoparticles to form a precipitate including copper oxide nanoparticles. Copper oxide nanoparticles prepared according to the method are effective photocatalysts for degrading organic dyes and antibacterial agents and exhibit anticancer activities.

4 Claims, 7 Drawing Sheets

(51) Int. Cl.
*C08G 69/48* (2006.01)
*B82Y 30/00* (2011.01)
*B82Y 40/00* (2011.01)

(56) References Cited

OTHER PUBLICATIONS

Sivaraj, R., Rahman, P. K., Rajiv, P., Salam, H. A., & Venckatesh, R. (2014). Biogenic copper oxide nanoparticles synthesis using Tabernaemontana divaricate leaf extract and its antibacterial activity against urinary tract pathogen. Spectrochimica Acta Part A: Molecular and Biomolecular Spectroscopy, 133, 178-181.

Padii et al., "Green synthesis of copper oxide nanoparticles using gum karaya as a biotemplate and their antibacterial application,". International Journal of Nanomedicine, 2013:8. 889-896.

Makarov et al., "Biosynthesis of Stable Iron Oxide Nanoparticles in Aqueous Extracts of Hordeum vulgare and Rumax acetose Plants," Langmuir, 30, 20, 5962-5986, May 1, 2014.

Sravanthi et al., "Biological synthesis and characterization of copper oxide nanaparticles using Antigonon leptopus leaf extract and their antibacterial activity," International Journal of Advanced Research, 4(8), 589-602, Aug. 2016.

Bordbar et al., "Green synthesis of copper oxide nanaparticles/clinoptilolite using *Rheum palmatum* L. root extract high catalytic activity for reduction of 4-nitro phenol, rhodamine B, and methylene blue," Journal of Sol-Gel Science and Technology, vol. 81, Nov. 2, 2016, pp. 724-733.

Rostami-Vartooni, "Green synthesis of CuO nanoparticles loaded on the seashell surface using Rumex crispus seeds extract and its catalytic applications for reduction of dyes," IET Nanobiotechnology, vol. 11, Issue 4, pp. 349-359, Jun. 2017.

Singh et al., "Biogenic synthesis of copper oxide nanoparticles using plant extract and its prodigious potential for photocatalytic degradation of dyes," Environmental research, 177, Jul. 23, 2019.

Tran, T. H., & Nguyen, V. T. (2014). Copper oxide nanomaterials prepared by solution methods, some properties, and potential applications: a brief review. International scholarly research notices, 2014.

SYNTHESIS OF COPPER OXIDE NANOPARTICLES

CROSS REFERENCE TO RELATED APPLICATIONS

This application is a division of Ser. No. 16/913,336, filed Jun. 26, 2020, pending, the priority of which is claimed in its entirety.

BACKGROUND

1. Field

The disclosure of the present patent application relates to a green or environmentally-friendly method for synthesizing metal oxide nanoparticles, and particularly, to a method of synthesizing copper oxide nanoparticles using *Rumex vesicarius* (i.e., ruby dock or bladder dock).

2. Description of the Related Art

Metal and metal oxide nanoparticles (NP) have applications in medicine, biology, chemistry, physics and electronics. Metal and metal oxide nanoparticles have unique properties compared to their respective bulk material properties, and may be used for the development of greener methodologies in the field of organic catalysis and photocatalysis reactions, for example.

Copper oxide nanoparticles, for example, are typically a semiconducting material with special optical, electrical and magnetic properties that may be useful for various applications, such as supercapacitors, near-infrared filters, magnetic storage media, sensors, catalysts, semiconductors, batteries, and solar energy conversion. Copper oxide nanoparticles may also have potential as antimicrobial and anticancer agents.

Given the diversity of applications of metal oxide nanoparticles, environmentally and biologically safe methods of synthesis of metal oxide nanoparticles are desired.

SUMMARY

A method of synthesizing metal oxide nanoparticles includes preparing a liquid extract of *Rumex vesicarius*, dissolving a metal salt in the liquid extract to provide an extract with metal salt, adding a base to the extract with copper salt to form a precipitate including copper oxide nanoparticles. The method overcomes drawbacks associated with prior chemical methods of synthesizing nanoparticles, while providing increased yield of the nanoparticles.

These and other features of the present teachings will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

A method of synthesizing metal oxide nanoparticles includes preparing a liquid extract of *Rumex vesicarius* (referred to commonly as ruby or bladder dock), dissolving a metal salt in the liquid extract to provide a solution with metal nanoparticles, heating the solution with metal nanoparticles, then adding a base to the heated solution to provide water soluble metal oxide nanoparticles. The metal can be copper, and the copper salt can be copper acetate, for example. The base, e.g., NaOH, can be added dropwise to the extract, with stirring. In an embodiment of the method, the metal oxide nanoparticles can be dried and calcined.

The liquid extract can be prepared by collecting, drying and grinding *Rumex vesicarius* leaves. A finer grind can provide a more concentrated extract. Boiled water can then be added to the ground material. The ground material can be soaked in the water for a length of time, e.g., twelve hours or more, to produce the liquid extract.

The method for synthesizing copper oxide nanoparticles described herein can produce copper oxide nanoparticles that exhibit a high degree of photochemical reactivity. The copper oxide nanoparticles are effective photocatalysts and efficiently degrade toxic water pollutants (e.g., pollutants released from textile and dyeing industries) in the presence of sunlight. As such, these nanoparticles can be used to efficiently clean drinking water, for example, or water otherwise polluted by such pollutants. Additionally, these copper oxide nanoparticles show antibacterial activities against various common bacterial strains and anti-cancer activity against model cancer cells of the HeLa cell line, in vitro. This method of producing copper oxide nanoparticles can prove valuable for solving the shortage of clean drinking water around the world, for reducing bacterial contaminants in environments or on surfaces, and for treating proliferative diseases, such as cancer.

Exemplary CuO NPs, as discussed below, show efficacy as photocatalysts for the degradation of pollutant dyes under UV light, anti-bacterial agents for a range of bacteria, and as anti-cancer agents. The CuO NPs can be useful in various applications, such as drinking water treatment or environmental cleanup, tailored antimicrobial surfaces, wound dressings, modified textiles and drug delivery, and cancer treatment, respectively. Formulations comprising CuO NPs prepared according to the present method may be effective alternatives in the development of preventions and treatment of infections, treatments of cancer and degradation of pollutant dyes.

The present teachings are illustrated by the following examples.

EXAMPLES

Example 1

Preparation of *Rumex vesicarius* Extract

*Rumex vesicarius* (known in Arabic as Humeidh) is an annual herb native to the Arabian peninsula and can be found throughout Saudi Arabia. Fresh leaves of *Rumex vesicarius* were collected from Al Muzahimiyah area and dried under the sun for a week. The dried leaves of *Rumex vesicarius* were washed with tap water several times before being washed with deionized water, and again allowed to dry. The dried, cleaned *Rumex vesicarius* leaves may be used directly or ground to a powder, with the understanding that the finer the grind, the more concentrated the extract.

Next, 100 ml of boiled, deionized water was added to 10 g of the dried, cleaned *Rumex vesicarius* leaves, mixed well together, and left to soak overnight at room temperature, with a cover to prevent evaporation or contamination, to produce the liquid extract. The liquid extract was then filtered with a Whatman paper, grade 1.

Example 2

Preparation of Copper Oxide Nanoparticles 2 mg copper acetate (monohydrate; Sigma-Aldrich) was dissolved into 100 ml deionized water, by stirring for 10 minutes at room temperature to provide a copper acetate solution. 10 mL of the *Rumex vesicarius* extract, prepared as above, was added to the copper acetate solution, and the mixture was stirred for 30 minutes at room temperature until an initial light blue color changed to a light green color, indicating preliminary formation of copper nanoparticles. The mixture was stirred for an additional three hours at room temperature, then heated, still with stirring, to 80° C. at which point the temperature was maintained for 3 minutes. 1 M aqueous sodium hydroxide (NaOH) was added dropwise under magnetic stirring, still at 80° C. to produce a brown precipitate. After the addition was completed, the precipitate was isolated by centrifugation at 10,000 rpm for 10 minutes and liquid was discharged from the precipitate. The pellet was transferred to a ceramic vessel which was placed in an oven for drying at 60° C., and then calcined at 400° C. for 4 hours to produce the exemplary copper oxide nanoparticles.

Example 3

Photodegradation of Dyes by the Copper Oxide Nanoparticles

Figure 1:
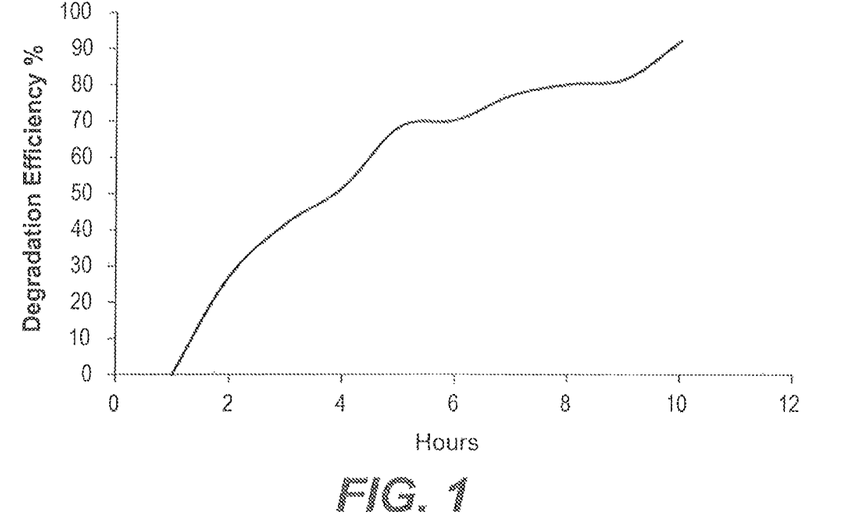
FIG. 1 depicts measured dye degradation efficiency for crystal violet (CV) dye using exemplary copper oxide (CuO) nanoparticles (NPs).
Figure 2:
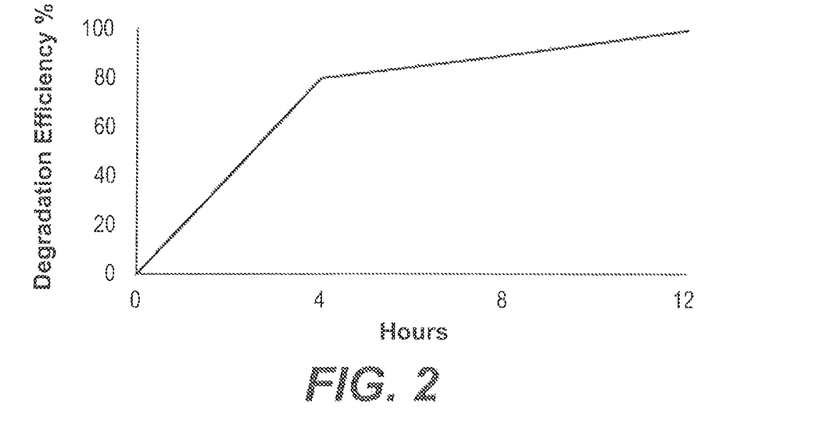
FIG. 2 depicts measured dye degradation efficiency for methylene blue (MB) dye using exemplary CuO NPs.

Photocatalytic activity of the exemplary CuO NPs was demonstrated in the context of degradation of pollutant dyes. Photocatalytic degradation activity of the exemplary CuO NPs was particularly demonstrated against crystal violet (CV) and methylene blue (MB) dyes under UV lamp irradiation. 1 mgL$^{-1}$ of exemplary CuO NPs (i.e., 0.03 mg CuO NPs) was added to 30 mL of either CV or MB dye solutions (dye solutions were 0.1% wt. aqueous solutions) in 50 ml glass beakers. The exemplary CuO NP/dye solutions were placed under stirring at a set distance from a UV lamp (365 nm wavelength: 0.7 AMPS). The range of wavelengths applied was from 190-950 nm. Optical absorption spectra were determined upon different light exposure durations using a UV/Vis spectrophotometer in order to monitor the rate of degradation by recording the reduction in absorption intensity of dye at the maximum wavelength. The degradation efficiency (DE) was calculated according to the following equation:

DE %=$(A_0-A)/A_0$×100 where $A_0$ is the initial maximum absorption (maximal absorption at the wavelength corresponding to the maximal absorption) and A is the maximum absorption intensity after photodegradation. The photocatalytic activity of the exemplary CuO NPs is demonstrated in FIGS. 1-2. The exemplary CuO NPs showed degradation efficiency for CV dye of 92.126% after 36 h under UV irradiation (FIG. 1) and for MB dye of 99.8435% after 12 h (FIG. 2). The efficient degradation of organic dyes in aqueous solutions by the exemplary CuO NPs synthesized using *R. vesicarius* L leaf extract opens a wide range of various photocatalytic applications, such as in water treatment and pollution control.

Example 4

Anticancer Activities of the Copper Oxide Nanoparticles

MIT assay was used to determine cytotoxicity of the exemplary CuO NPs to model cancer cells of the HeLa cell line. HeLa cells were cultured at optimal growth conditions of 5% $CO_2$ in air atmosphere and 37° C. passaged regularly until ready to use. Cells were regularly checked using an inverted microscope. The total number of cells used in the below experiments were determined by a trypan blue exclusion test (0.4% trypan blue) using a cell counter. HeLa cells were seeded in a 96 well plate at a density of 2×10$^5$ cell/well in 90 µl optimized medium. Cells were allowed to settle for 24 hours before being treated with one of six concentrations (5, 10, 20, 30, 50 and 100 µL) of CuO NPs or *R. vesicarius* L leaf extract. A control (untreated) set of cells were simultaneously plated. Treated cells were allowed to grow further for 24 hours, 48 hours and 72 hours. Each experiment was performed in four replicates. Values of optical densities were normalized according to those of the control cells. Therefore, cell viability values of control cells is defined to be 100%, while values of treated cells have values below or above 100% according to the following equation:

$$\text{Cell Viability (\%)} = \left(\frac{\text{Absorbance of individual treatment}}{\text{Absorbance of the control}}\right) \times 100$$

Figure 3:
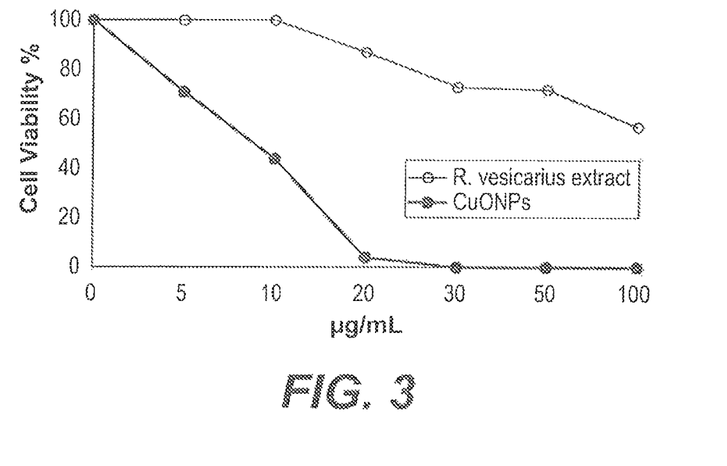
FIG. 3 depicts cytotoxicity of exemplary CuO NPs against HeLa cells.

MIT results showed that synthesized CuO NPs significantly decreased the viability of a human cervical adenocarcinoma cell line (HeLa) in a dose-dependent manner. The results showed that CuO NPs has a more cytotoxic effect than *R. vesicarius* L leaf extract against HeLa cell line as shown in FIG. 3.

Example 5

Antibacterial Activities of the Copper Oxide Nanoparticles

Figure 4A:
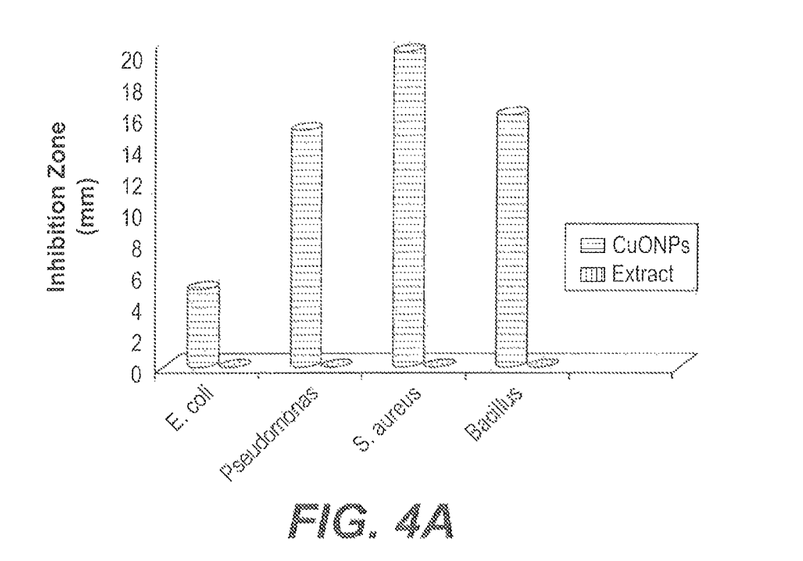
FIG. 4A depicts antibacterial activity of exemplary CuO NPs against several bacteria. with extract alone as negative control.

CuO NPs were analyzed for antimicrobial activity against various bacterial strains. FIG. 4A shows antibacterial activity of CuO NPs according to a diffusion method for various strains of bacteria. Results indicate that the exemplary CuO NPs are effective antimicrobial agents against a variety of bacteria.

Figure 4B:
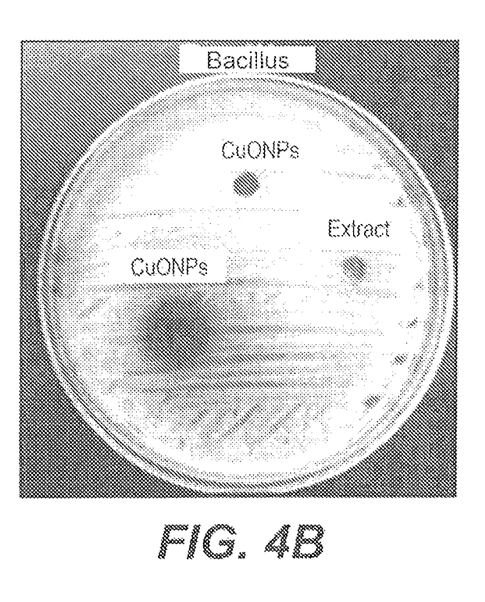
FIG. 4B shows an exemplary experimental plate.

The antibacterial activity of the exemplary Cut) NPs was evaluated using the agar well-diffusion method. Four bacterial strains (*Escherichia coli, Pseudomonas aeruginosa. Staphylococcus aureus* and *Bacillus* Sp) were tested. The bacteria examined were grown in blood agar at 37° C. for 18 h, at which point bacterial colonies were collected and suspended in 0.85% NaCl, and adjusted to 0.5 MacFarland (108 CFU/mL) turbidity. The bacterial suspensions were smeared on Muller Hinton agar (MHA) plates (FIG. 4B). 1 mg/mL and 5 mg/mL of exemplary CuO NPs and 100 μL of *R. vesicarius* L leaf extract were loaded in the agar and the plates were incubated at 37° C. for 18-24 h. After incubation, the plates exhibited clear zones of inhibition around the wells with CuO NPs and not significantly around the extract control, which confirm the antibacterial activity of the exemplary CuO NPs. The inhibition zone around each well was measured as its diameter.

Example 6

Characterization of the Copper Oxide Nanoparticles

Figure 5:
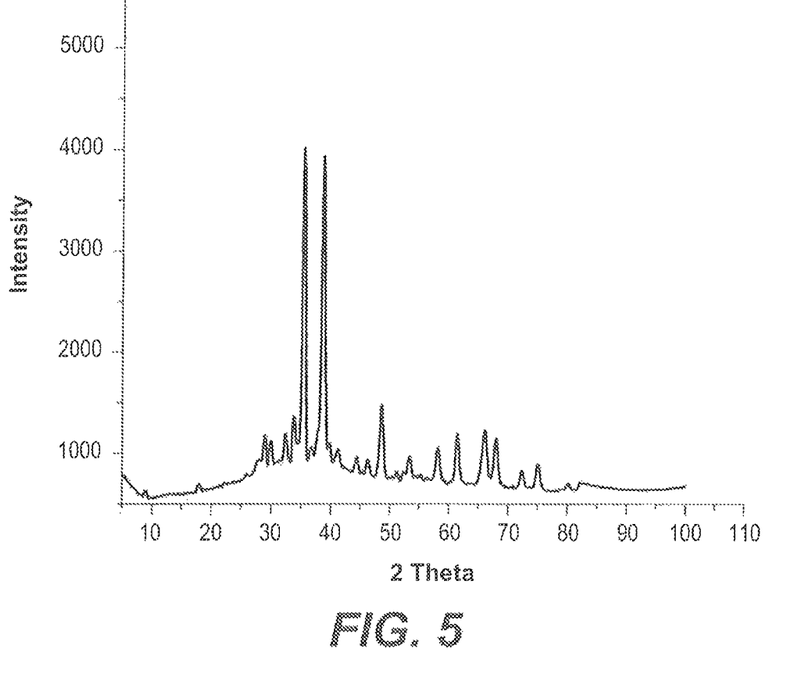
FIG. 5 depicts the X-ray powder diffraction (XRD) pattern of exemplary CuO NPs.
Figure 6A:
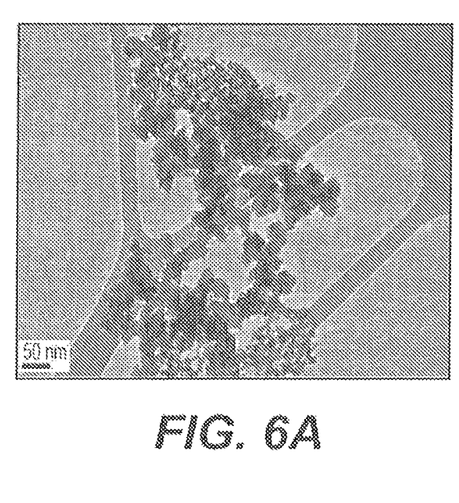
FIGS. 6A-6D depict transmission electron microscopy (TEM) images of exemplary CuO NPs, at a range of scales.
Figure 6B:
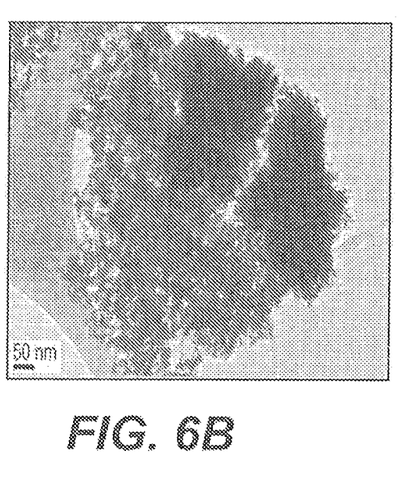
Figure 6C:
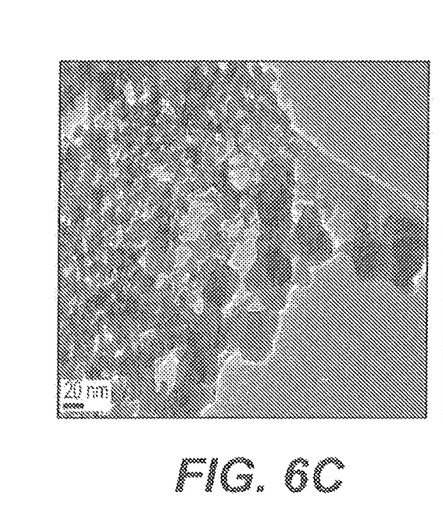
Figure 6D:
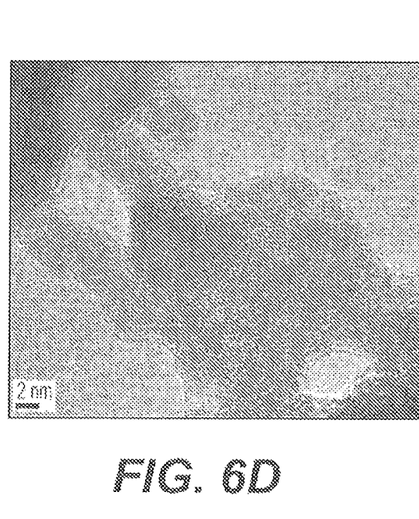

The CuO nanoparticles obtained in Example 2 above were characterized using a variety of instrumentation. The X-Ray diffraction (XRD) patterns of the copper oxide nanoparticles prepared using copper acetate is presented in FIG. 5. X-ray diffraction measurements of the synthesized copper oxide nanoparticles were taken by coating glass substrates with the exemplary copper oxide nanoparticles, which takes the form of a powder, and using a Bruker D8 ADVANCE X-ray diffractometer operating at a voltage of 40 kV and a current of 40 mA with Cu Kα radiation at a wavelength of 1.5418 Å. The XRD analysis indicates major diffraction peaks at 2θ of 35°, 38°, 43°, 48°, 50°, 58°, 61°, 67° and 74°. Peaks at 43°, 50° and 74° correspond to crystal planes (111), (200) and (220) of the cubic phase of CuO NPs, respectively. The other peaks are presumptively attributed to reflection lines of monoclinic CuO NPs. The (Pattern: COD 9012954) is consistent with the planes.

The morphology of the copper oxide nanoparticles was characterized using transmission electron microscopy (TEM) (JEM-2100, JEOL, USA). FIGS. 6A-6D show TEM images for the exemplary copper oxide nanoparticles at several length scales. TEM images were used to investigate the crystalline structure of the nanoparticles using selected area electron diffraction (SAED), particles size distribution and individual particle sizes. TEM images show the presence of irregularly shaped nanoparticles forming a network due to agglomeration.

Energy Dispersive X-ray (EDX) spectroscopy was conducted (JSM-2100F, JEOL, USA). An aqueous solution including CuO NPs was sonicated and a drop of said solution was placed on carbon-coated Cu grids and allowed to dry. Selected area FDX from the TEM analysis discussed above was performed to determine the chemical composition of synthesized nanostructures.

Figure 7:
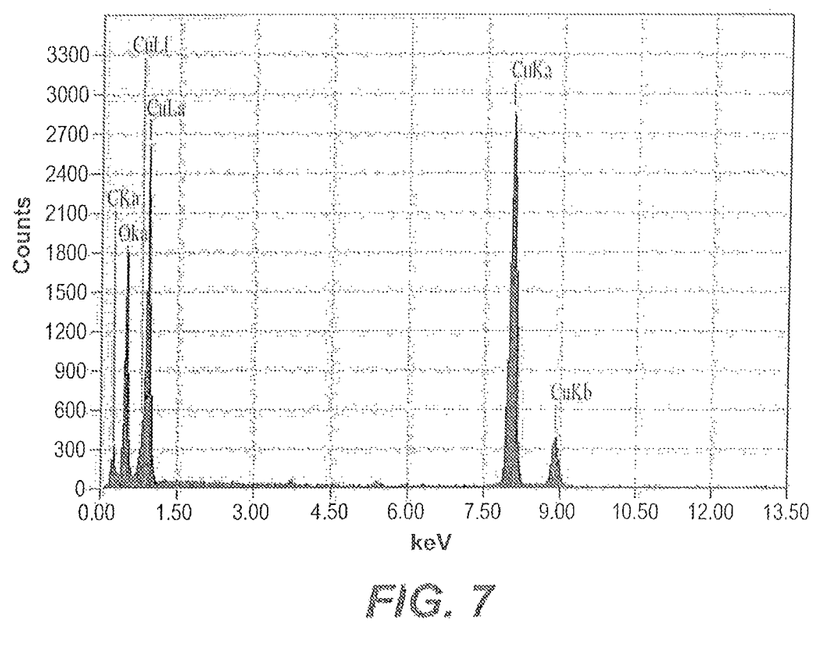
FIG. 7 depicts energy-dispersive X-ray (EDX) spectroscopy results of exemplary CuO NPs.

The results shown in FIG. 7 confirm the presence of copper and oxygen as expected in the nanoparticles. Further, the results shown in FIG. 7 indicate the nanoparticles to be substantially pure copper oxide, with a minor carbon-consistent peak likely due to the grid of the substrate.

A photoluminescence (PL) spectrum was measured for the exemplary CuO NPs dispersed in double distilled water using a Perkin-Elmer photoluminescence spectrophotometer equipped with a Xenon lamp as an excitation source. Experiments were performed at room temperature.

Figure 8:
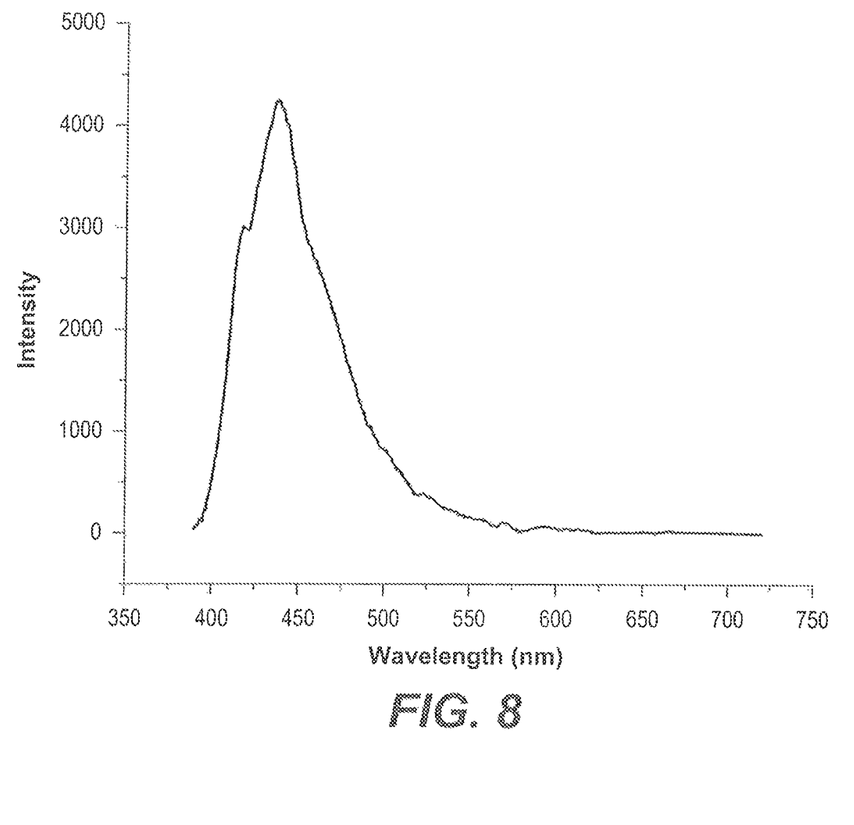
FIG. 8 depicts the measured photoluminescence (PL) spectrum of exemplary CuO NPs.

The photoluminescence spectrum measures electron transition energies within the exemplary CuO nanoparticles. The emission peak may be used to estimate corresponding electronic energy levels (Sawsan Dagher et al. 2014). The PL spectrum of exemplary CuO NPs shown in FIG. 8 exhibits a strong blue emission peak centered at 438 nm (excited at about 320 nm by the xenon lamp). This peak is typical of the near-band-edge emission peak of CuO.

It is to be understood that the method of synthesizing copper oxide nanoparticles and related compositions and methods are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. Copper oxide nanoparticles, the copper oxide nanoparticles resulting from the method comprising the steps of:
   a) adding boiled water to *Rumex vesicarius* material to produce a liquid extract;
   b) filtering the extract to produce a filtered liquid extract;
   c) dissolving a copper salt in the filtered liquid extract to produce a solution with copper nanoparticles;
   d) adding a base to the solution with copper nanoparticles to form a precipitate;
   e) removing liquid from the precipitate to provide a pellet;
   f) drying the pellet, to produce a powder including the copper oxide nanoparticles.

2. A method of degrading an organic dye comprising:
   contacting the copper oxide nanoparticles of claim 1 with a solution including organic dyes; and
   exposing the solution to ultraviolet radiation after contacting the copper oxide nanoparticles with the organic dyes to degrade the organic dyes.

3. The method of claim 2, wherein the organic dye is at least one of crystal violet or methylene blue.

4. A method of eliminating bacteria comprising contacting the bacteria with the copper oxide nanoparticles of claim 1.

* * * * *